US012355782B1

(12) United States Patent
Sylvester et al.

(10) Patent No.: US 12,355,782 B1
(45) Date of Patent: Jul. 8, 2025

(54) ASSESSING COORDINATED MALICIOUS BEHAVIOR TOWARDS A SERVICE PROVIDER NETWORK

(71) Applicant: Amazon Technologies, Inc., Seattle, WA (US)

(72) Inventors: Jared Sylvester, Ellicott City, MD (US); Michael Lowney, Arlington, VA (US); Catherine Watkins, Minneapolis, MN (US); Wayne Alan Fullen, Falls Church, VA (US); John Paul Schweitzer, Virginia Beach, VA (US); Sameer Anil Murudkar, Sammamish, WA (US)

(73) Assignee: Amazon Technologies, Inc., Seattle, WA (US)

(*) Notice: Subject to any disclaimer, the term of this patent is extended or adjusted under 35 U.S.C. 154(b) by 139 days.

(21) Appl. No.: 18/216,848

(22) Filed: Jun. 30, 2023

(51) Int. Cl.
*H04L 9/40* (2022.01)
(52) U.S. Cl.
CPC .............. *H04L 63/14* (2013.01); *H04L 63/20* (2013.01)
(58) Field of Classification Search
CPC ................................ H04L 63/14; H04L 63/20
See application file for complete search history.

(56) References Cited

U.S. PATENT DOCUMENTS

2025/0071040 A1* 2/2025 Wang .................... G16Y 40/10

OTHER PUBLICATIONS

Class: AWS.SecurityHub by Amason, API version: Oct. 26, 2018, 1035 pages (Year: 2018).*

* cited by examiner

*Primary Examiner* — Oleg Korsak
(74) *Attorney, Agent, or Firm* — Eversheds Sutherland (US) LLP

(57) ABSTRACT

This disclosure describes building a graph that is based on which IP address sources are active in the same time periods. By creating a node for each IP address with some moderate level of suspicious activity and connecting the nodes for any IP addresses that are engaging in that activity at roughly the same time, the graph represents scenarios of possible cooperation between sets of IP addresses. Nodes in this graph and the links between are assigned values based on how much suspicious activity they engage in during each time window. These values decay over time if no new suspicious activity occurs. By analyzing the resulting graph at any particular point in time, how similar two IP addresses have been behaving recently can be measured without having to keep track of their total history of activity over the last time period.

20 Claims, 10 Drawing Sheets

ASSESSING COORDINATED MALICIOUS BEHAVIOR TOWARDS A SERVICE PROVIDER NETWORK

BACKGROUND

Service providers offer cloud-based services via service provider networks to fulfill user's computing service needs without the users having to invest in and maintain computing infrastructure required to implement the services. These service providers are generally in the form of on-demand computing platforms that may provide network-based computing resources and functionality to implement various types of cloud-based services, such as, for example, scalable-storage services, computer-processing services, and so forth. In some examples, developers may utilize services offered by the service provider to run the systems and/or applications using virtual services (or "instances") provisioned on various configurations of hardware-based resources of a cloud-based service.

Bad actors may act in a malicious manner towards service provider networks in order to obtain services without payment, confidential information, etc. Security services of the service provider networks operate on bad actors in isolation. Information gathered about the (mis) behavior of one Internet protocol (IP) address is only used to guide how one responds to that particular IP address. Generally, no attempt is made to learn about behaviors that are spread across multiple IP addresses. Better judgements could be made about network effects if the abstract question "which IP addresses are behaving similarly to which others?" could be answered, i.e., if networks of bad actors could be found and addressed collectively rather than addressed disjointly, one by one.

However, looking for patterns across IP addresses is much harder than treating each IP individually. In large part, this is a data volume problem. For an IP addresses it would be necessary to make 2n decisions about which pairs of IP addresses are acting similarly, and 2n decisions about which arbitrarily sized subsets of IP addresses are similar. "Behaving similarly" also entails a consideration of time. It is necessary to know how IP addresses are behaving similarly now and in the near future, not in the abstract. This in turn necessitates information about past behavior, further exacerbating the increase in data volume needed. IP addresses also have many different types of behavior that can be characterized in many different ways. Taken together, this moves from a situation in which mitigation decisions are based on a linear amount of current data to a situation in which mitigation decisions are based on an exponential amount of historical data along multiple dimensions.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
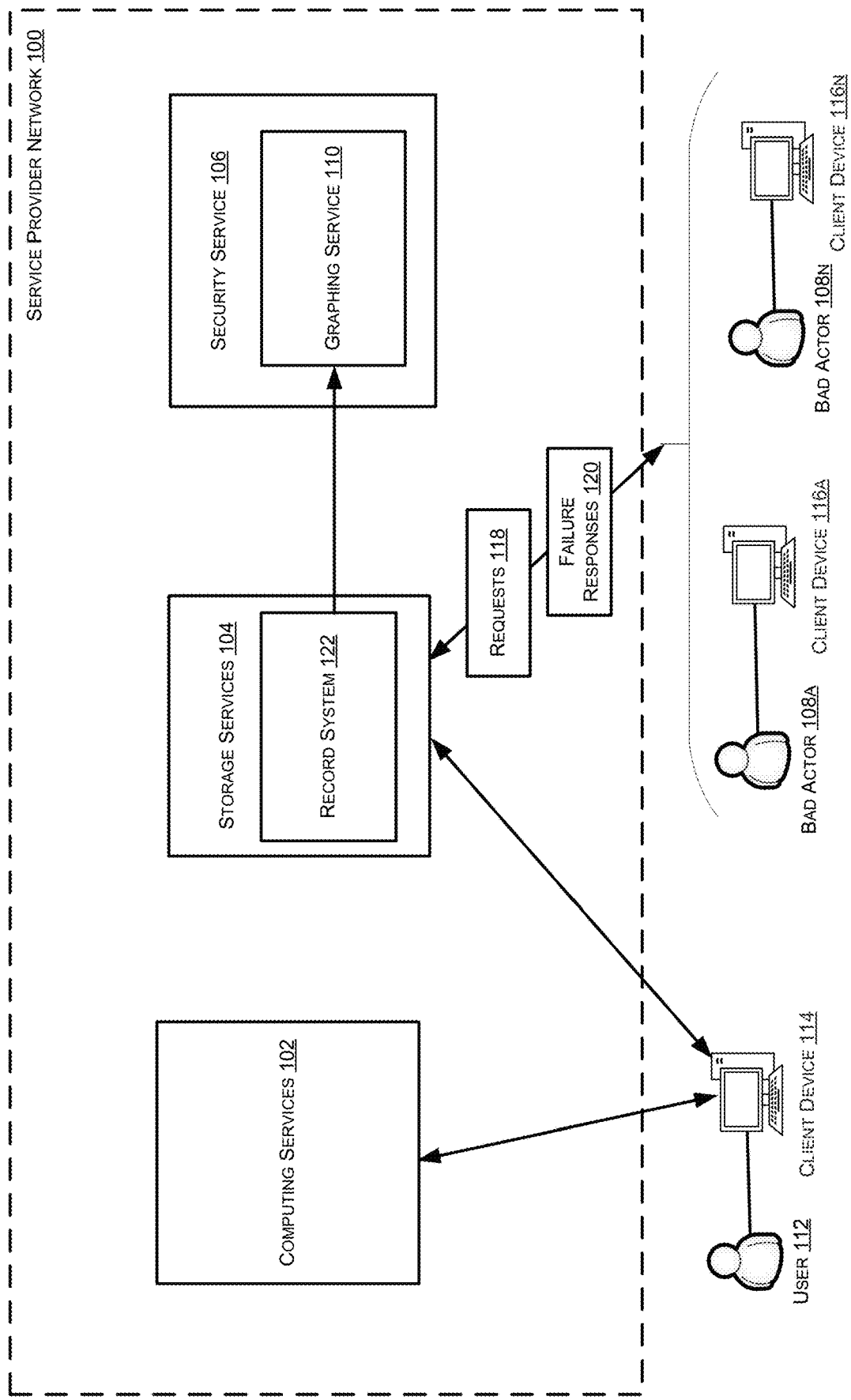
FIG. 1 schematically illustrates a system-architecture diagram of an example service provider network that includes a graphing service within a security service for detecting bad actors.

This disclosure describes, at least in part, techniques and architecture for identifying similar groups of IP addresses using a very sparse information feed for malicious behavior. Groups of similar IP addresses may be discovered using an input stream consisting of, for example, "did the IP address receive greater than 50 failure responses in the last X minutes, and if so, how many?" in response to service inquiries at a service provider network. Using only this information regarding millions of IP addresses allows a graph of IP address interactions to be built with less data (up to four orders of magnitude) than the raw input. The state of the graph only needs to be maintained from one time window to the next. The state of the graph does not need to reference any state further back in history. Despite the limited amount of data used, the state of the graph may successfully predict which IP addresses will act in similar ways with respect to services of the service provider network scanning up to several days in the future.

More particularly, birdshot scanning may be used to identify a bad actor using multiple IP addresses to attack a service provider network. Generally, birdshot scanning refers to a bad actor making a barrage of requests for access to services of a service provider network from multiple IP addresses all at once. The bad actor knows the requests will eventually be blocked but hope to get as many requests as possible in under a latency limit before that block happens. Some bad actors are aware enough of the service provider network's defenses that the bad actors discontinue their scanning before the service provider network's block can be instigated. In order to maximize their overall volume, many of the bad actors will issue this volley of requests from their set of IP addresses, wait until any resulting block is likely to have expired, fire another volley of requests at the service provider network from those IP addresses and wait again, repeating as desired. This rhythmic, off-and-on pattern of behavior is an important part of what makes something a "birdshot" scan to differentiate it from a more general pattern of high volumes of requests in a short time frame.

That cadenced behavior is what is being targeted by the techniques and architecture described herein. While the techniques and architecture described herein are described with respect to storage services provided by a service provider network, the techniques and architecture described herein may also be used with respect to other services provided by a service provider network, and generally may be applied in situations where similarity detection is desirable.

Birdshot scanners hit service provider networks from multiple IP addresses near-simultaneously, hoping to get in enough requests in their opening salvo before inevitably being blocked. In configurations, two IP addresses do not need to make requests at exactly the same millisecond in order to be active "simultaneously" for purposes of the techniques and architecture described herein. Events may be aggregated together into some length of time and all events at the same time may be considered to be concurrent. There are at least two approaches that might be taken in detecting this type of behavior. One is either to decrease the latency of detections or the other is to notice that there is a burst-and-wait pattern occurring and be ready to block the bad actor's IP addresses when the bad actor returns again to fire their next burst of requests. Generally, decreasing latency has a hard limit imposed by reading data of a storage service record system, e.g., an event bus archive. Thus, noticing that groups of IP addresses are acting in a coordinated manner and being ready for them the next time may provide a more suitable option.

There are a number of approaches to detecting these groups of birdshot scanners. For example, a storage service analytic exploration may be used. These can be organized into at least two rough approaches: detecting when an individual IP address has a rhythmic pattern of turning off-and-on or detecting when a group of IP addresses is acting in concert, controlled by a single bad actor. The techniques and architecture described herein generally fit into the latter category. The techniques and architecture generally attempt to do so by considering only the volume of scans by an IP address made at a given time. Information about user agents, source autonomous system number (ASN), transport layer security (TLS) fingerprints, names of storage buckets requested, etc., is not being added but may be in example configurations.

Conventionally, a "network" is a system of interrelated objects. A "graph" is an abstract model for representing networks. (In this context, not a synonym for "chart" or "plot.") A graph is composed of a set of "nodes," a.k.a. "vertices" that represent discrete entities, and a set of "edges" that represent the connection between entities. A graph named "G" with the set of vertices "V" and set of edges "E" is typically denoted G (V. E). Edges may have weights assigned to them to represent a property-like distance or throughput capacity. The edges may be directed (for example an edge in a graph of social media users may be directed to indicate that a user follows @paulg, but @paulg does not follow the user) or undirected (for example a collaboration graph may have an edge between a first user and a second user since both users have both contributed to the same repos). Graphs may only allow for an edge between a pair of nodes to be present or absent, or the graphs may allow multiple edges between the same pair of nodes (for example, one edge per repo that two employees have co-contributed to). In the latter case, the graph may be referred to as a multigraph.

Generally, edges of graphs may have weights, but vertices typically do not have any weight/value/attribute assigned to them. When a graph's vertices do have some value assigned to them, it is sometimes referred to as a "network" or as a "property graph." "Property graph" is more of a term from data modeling/information science than math/computer science (CS) theory and can also encompass graphs in which nodes and edges are given not only weights and values but different types. For example, a property graph of a service provider network collaboration may have vertex types for people, repos, documents and teams, and edges for committing to a repo, reviewing a CR, editing a document, commenting on a document, reading a document, belonging to a team, reporting to a manager, and so on. Models mentioned herein may be referred to as graphs even though values are assigned to each node.

In configurations, a graph may be created by initializing the state to have an empty graph, with no nodes or edges represented by $G_{prior}$=new_graph (V={ }, E={ }), where $G_{prior}$ represents a prior graph (however, at this point it is the first graph for the following process), V represents a set of vertices (nodes), and E represents a set of edges connecting vertices. In some configurations, incoming storage service records, e.g., event archive bus (EBA) records, may be filtered, where the records may relate to attempts to access buckets within the storage service. Thus, only requests receiving a failure response, e.g., NoSuchBucket response, are used. In configurations, only unauthenticated access is considered. This may reduce data volume by approximately 5 times.

In each time window, activity of IP addresses may be grouped by time window and remote IP address. In configurations, records for all IP addresses that received failure responses for fewer than a predetermined threshold, e.g., 50 distinct failure responses for 50 distinct storage buckets in the time window may be discarded. The predetermined threshold may be in a range of 30 to 70 distinct failure messages depending on the configuration.

A new undirected graph $G_{new}$ with a vertex for each of the remaining IP addresses may be created in each time window. Each node's value $v_i$ may be set to be the approximate number of distinct buckets for which the node received a failure response, e.g., NoSuchBucket response, in this time period.

All pairs of nodes in $G_{new}$ may be connected and each edge may be given a weight $w_{ij}$: =similarity $(v_i,v_j)$ w_{ij}=\mathrm{similarity} (v\_i,v\_j) $w_{ij}$: =similarity $(v_i,v_j)$, where weight $w_{ij}$ represents a weight based on similarity between vertices i and j (based on their individual vortex values). The similarity is determined by using the function mathrm, as described further herein. In configurations, similarity may be determined by creating a system to build this graph but set the values of all edges in the graph to be 1 if the IP addresses were active concurrently and 0 otherwise. The similarity of two agents may be based on those agents' activity levels. If IP address A scans 500 buckets in a time period while IP address B scans 525 that should result in a much higher weight on the edge between them than if IP address B had scanned only 125 buckets in the same time period. Thus, the similarity between two nodes (vertices) may be described as mathrm=sim (i,j)=1.0−$((|v_i-v_j|)/(\max (v_i, v_j)))$ P, where $v_i$, $v_j$ are an approximate number of unsuccessful requests from remote IP addresses attempting to access storage buckets of the storage service of the service provider network during the first time window and where p is a power factor.

In configurations, in each time window the values of the existing graph $G_{prior}$ may be decayed by multiplying all node (v) and edge weights (w) by decay rates (δ): w': =$\delta_{edges} \cdot w_{ij}$ and v': =$\delta_{nodes} \cdot v_i$ with $\delta_{edges}$, $\delta_{nodes}$ <1.0. By multiplying the values by something less than 1.0, if no new activity is observed for a given IP address (node), its value will slowly drop. In some configurations, the decay rate is in a range of 0.950 to 0.999. As an example, a decay value of 0.99 giving a half-life of 69 iterations, or 11.5 hours, may be used. In configurations, it may be desirable to decay things a little more slowly to capture longer-range patterns.

$G_{prior}$ and $G_{new}$ may then be merged together into a resulting graph. If an IP address is in $G_{new}$ but was not present in $G_{prior}$, then the IP address may be inserted into the resulting graph as node (vertex). If the IP address was already present in $G_{prior}$, the prior and new values may be added together. The same may be done for pre-existing edges.

Nodes whose value has fallen below a predetermined threshold may be filtered out. This prevents the resulting graph from growing unbounded. This may also be done for edges whose value has fallen below a predetermined threshold. Once edges are filtered out, any isolated edges may be removed, i.e., nodes with no edges connecting them to other nodes. The resulting graph may be used as $G_{prior}$ when repeating the process in the next time window. In configurations, the time window may be in a range of 1 to 10 minutes, with some configurations using 5 minutes as the time window. In some configurations, the time window may be dynamic, e.g., one time window may be different in duration with respect to another time window:

Given the state of the graph at a certain point in time, the most active nodes and/or communities of interest may be determined. Once the most active nodes, e.g., IP addresses, and/or communities of interest are determined, a mitigation action may be performed. For example, if the summed activity of all members (nodes) of a birdshot scanning group is above a predetermined threshold, a mitigation for all of the corresponding IP addresses may be performed, e.g., blocking the IP addresses for a period of time or some other bad actor identifier such as, for example, an account number. This is a decision about multiple identifiers based on their collective behavior. As another example, a length of mitigation may be increased to all members of the group. This may be a lower risk way of implementing the first option (if the summed activity of all members (nodes) of a birdshot scanning group is above a predetermined threshold, a mitigation for all of the corresponding IP addresses may be implemented, e.g., blocking the IP addresses for a period of time), because the longer mitigations would only go into effect when the IP addresses next behave maliciously, and only on those IP addresses that do participate. Thus, if a benign IP address is mistakenly inferred to be a member of a malicious group, the benign IP address may not be blocked since it would not trigger any existing analytics. As a further example, the threshold used by an original storage service analytic may be lowered so that the offending IP address may be cut off sooner when the offending IP address next launches an attempt to access services. This may not significantly reduce the time until detection the next time around but might be able to limit the damage done by cutting off successive attempts sooner. As an additional example, mitigation may not be issued directly based on the graph processes output, but the output may be provided to other components such as an adjudicator/confidence scoring or "rules engine" so that other analytics may adjust their behavior based on the IP addresses participation in an offending group of IP addresses. In configurations, the mitigation action does not need to be applied every time window.

As an example, in configurations, a method may include obtaining, by a security service of a service provider network, records related to unsuccessful requests from remote Internet protocol (IP) addresses attempting to access the service provider network during a first time window and assigning a first node value to each node of a first graph, wherein each first node value is related to an approximate number of unsuccessful requests from a corresponding remote IP address during the first time window. The method may also include assigning a first edge weight value to each edge connecting related pairs of nodes based on similarity. The method may further include adding the first node values to second node values of a second graph from a second time window prior to the first time window to provide third node values and adding the first edge weight values to second edge weight values of the second graph from the second time window to provide third edge weight values. The method may also include removing nodes from a third graph that have third node values below a first predetermined threshold and removing edges from the third graph that have third edge weight values below a second predetermined threshold. The method may further include determining a set of nodes that have third node values above a third predetermined value and based at least in part on the set of nodes, performing a mitigation action with respect to corresponding IP addresses of the set of nodes. In configurations, the mitigation action does not need to be applied every time window.

In configurations, the method may include removing first nodes from the third graph that have no edges connecting the first nodes to other nodes.

In configurations, the method may include multiplying all second node values and second edge weights of a second graph by a decay rate. In some configurations, the decay rate is in a range of 0.950 to 0.999.

In configurations, the mitigation action comprises blocking the corresponding IP addresses of the set of nodes from accessing the service provider network. In some configurations, blocking the corresponding IP addresses of the set of nodes from accessing the service provider network comprises blocking the corresponding IP addresses of the set of nodes from accessing the service provider network when the set of nodes appears in a subsequent third graph that have node values above the third predetermined value during a subsequent time window. In some configurations, the mitigation action may involve using a bad actor identifier such as, for example, an account number, the IP addresses, etc., to block the bad actor associated with the IP addresses and/or the IP addresses.

In configurations, the similarity is calculated based on sim $(i,j)=1.0-(((v_i-v_j)/(\max(v_i, v_j)))^P$, wherein $v_i$, $v_j$ are an approximate number of unsuccessful requests from remote IP addresses attempting to access services of the service provider network during the first time window, and wherein p is a power factor.

In configurations, the method may include inserting a node in the third graph representing an IP address present in the first graph and not present in the second graph.

In configurations, the method may include using the third graph in a subsequent time window as the second graph.

In configurations, the method may include discarding records for remote IP addresses having a number of unsuccessful requests attempting to access services of the service provider network during the first time window that is below a fourth predetermined threshold.

Thus, the techniques and architecture described herein provide for building a graph that is based on which IP address sources are active in the same time periods. By creating a node for each IP address with some moderate level of suspicious activity and connecting the nodes for any IP addresses that are engaging in that activity at roughly the same time (for example, within a 5-minute window), the graph usefully represents scenarios of possible cooperation between any sets of IP addresses in a way that allows one to uncover behavioral similarities between arbitrary subsets of IPs. Nodes in this graph and the links between are assigned values based on how much suspicious activity they engage in during each 5-minute (or any period of time) window. These values decay over time if no new suspicious activity occurs. By analyzing the resulting graph at any particular point in time, how similar two IP addresses have been behaving recently can be measured without having to keep track of their total history of activity over the last several days. Thus, bad actors using the birdshot scanning attack can be detected quickly and more easily using less data than prior approaches, and computing and storage resources of the service provider network are not used as long, freeing up computing resources for processing of other data and/or other projects and/or services within the service provider network. Bad actors can also be detected more quickly and blocked, thereby saving stolen resources, confidential information, etc.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 schematically illustrates a system-architecture diagram of an example service provider network 100. The service provider network 100 may comprise servers (not illustrated) that do not require end-user knowledge of the physical location and configuration of the system that delivers the services. Common expressions associated with the service provider network may include, for example, "on-demand computing," "software as a service (SaaS)," "cloud services," "data centers," and so forth. Services provided by the service provider network 100 may be distributed across one or more physical or virtual devices.

As may be seen in FIG. 1, the service provider network 100 includes computing services 102 and storage services 104 that are provided by the service provider network 100. As is known, in configurations, other types of services may also be provided by the service provider network 100. The computing services 102 and storage services 104, as well as any other services, may be provided to businesses or individuals. In configurations, the service provider network 100 includes a security service 106 that provides security, e.g., protection against fraud from bad actors 108a-108n. In configurations, the security service 106 includes a graphing service 110.

In configurations, a user 112 accesses the service provider network 100 using a client device 114. The user 112 may thus obtain computing services 102 and storage services 104, as well as other services, from the service provider network 100, using the client device 114.

One or more bad actors 108a-108n may use client devices 116a-116n to use birdshot scanning using multiple IP addresses to attack the service provider network 100. Generally, birdshot scanning refers to a bad actor, e.g., bad actor 108a, making a barrage of requests 118 for access to services, e.g., storage services 104 of the service provider network 100, from multiple IP addresses all at once. The bad actor 108a knows the requests 118 will eventually be blocked but hopes to get as many requests 118 as possible in under a latency limit before that block happens. Some bad actors are aware enough of the service provider network's defenses that the bad actors discontinue their scanning before the service provider network's block can be instigated. The bad actor 108a receives failure responses 120 in response to the requests 118 prior to the service provider network's block is instigated.

In order to maximize their overall volume, the bad actor 108a may issue this volley of requests 118 for access to services, e.g., services from storage services 104, from their set of IP addresses using the client devices 116a-116n, wait until any resulting block is likely to have expired, fire another volley of requests 118 for access to services, e.g., services from storage services 104, using the client devices 116a-116n at the service provider network 100 from those same IP addresses and wait again, repeating as desired, for example once a day, every other day, multiple times a day at varying intervals, etc. This rhythmic, off-and-on pattern of behavior is an important part of what makes something a "birdshot" scan to differentiate it from a more general pattern of high volumes of requests 118 in a short time frame. That cadenced behavior is what is being targeted by the techniques and architecture described herein. While the techniques and architecture described herein are described with respect to storage services 104 provided by the service provider network 100, the techniques and architecture described herein may also be used with respect to other services provided by the service provider network 100, and generally may be applied in situations where similarity detection is desirable.

The bad actor 108a acting as a birdshot scanner hits the service provider network 100 from multiple IP addresses near-simultaneously using the client devices 116a-116n, hoping to get in enough requests 118 in their opening salvo before inevitably being blocked. In configurations, two IP addresses do not need to make requests at exactly the same millisecond in order to be active "simultaneously" for purposes of the techniques and architecture described herein. Events may be aggregated together into some length of time and all events at the same time may be considered to be concurrent. There are two approaches that might be taken in detecting this type of behavior. One is either to decrease the latency of detections or the other is to notice that there is a burst-and-wait pattern occurring and be ready to block the bad actor's IP addresses when the bad actor 108a returns again to fire their next burst of requests 118. Generally, decreasing latency has a hard limit imposed by reading data of record system 122 of the storage system, e.g., an event bus archive. Thus, noticing that groups of IP addresses are acting in a coordinated manner and being ready for them the next time may provide a more suitable option.

Thus, the user 112 accesses the service provider network 100 using the client device 114. The user 112 may thus obtain computing services 102 and storage services 104, as well as other services, from the service provider network 100, using the client device 114. Meanwhile, one or more bad actors 108a-108n may use client devices 116a-116n to use birdshot scanning using multiple IP addresses to attack the service provider network 100. The bad actor 108*a* receives failure responses 120 in response to the requests 118 prior to the service provider network's block is instigated. For example, one or more bad actors 108*a*-108*n* may use client devices 116*a*-116*n* to attack storage services 104 to try and obtain service fraudulently, confidential information, etc. The record system 122 of the storage services 104 keeps records of attempts to access the storage services 104 and provides records of the of the requests 118 and failure responses 120 to the graphing service 110 for use in creating graphs to detect birdshot scanning.

There are a number of approaches to detecting these groups of birdshot scanners. For example, a storage service analytic exploration may be used. These can be organized into two rough approaches: detecting when an individual IP address has a rhythmic pattern of turning off-and-on or detecting when a group of IP addresses is acting in concert, controlled by the single bad actor 108*a*. The techniques and architecture described herein generally fit into the latter category. The techniques and architecture generally attempt to do so by considering only the volume of scans by an IP address made at a given time. Information about user agents, source autonomous system number (ASN), transport layer security (TLS) fingerprints, names of storage buckets requested, etc., is not being added but may be in example configurations.

Groups of similar IP addresses may be discovered using an input stream consisting of, for example, "did the IP address receive greater than 50 failure responses in the last X minutes, and if so, how many?" in response to service inquiries at a service provider network. Using only this information about millions of IP addresses allows a graph of IP address interactions to be built with less data (up to four orders of magnitude) than the raw input. The state of the graph only needs to be maintained from one time window to the next. The state of the graph does not need to reference any state further back in history. Despite the limited amount of data used, the state of the graph may successfully predict which IP addresses will act in similar ways with respect to services of the service provider network scanning up to several days in the future.

As previously noted, conventionally a "network" is a system of interrelated objects. A "graph" is an abstract model for representing networks. (In this context, not a synonym for "chart" or "plot.") A graph is composed of a set of "nodes," a.k.a. "vertices" that represent discrete entities, and a set of "edges" that represent the connection between entities. A graph named "G" with the set of vertices "V" and set of edges "E" is typically denoted G (V,E). Edges may have weights assigned to them to represent a property-like distance or throughput capacity. The edges may be directed (for example an edge in a graph of social media users may be directed to indicate that a user follows @paulg, but @paulg does not follow the user) or undirected (for example a collaboration graph may have an edge between a first user and a second user since both users have both contributed to the same repos). Graphs may only allow for an edge between a pair of nodes to be present or absent, or the graphs may allow multiple edges between the same pair of nodes for example, one edge per repo that two employees have co-contributed to). In the latter case, the graph may be referred to as a multigraph.

Generally, edges of graphs may have weights, but vertices typically do not have any weight/value/attribute assigned to them. When a graph's vertices do have some value assigned to them, it is sometimes referred to as a "network" or as a "property graph." "Property graph" is more of a term from data modeling/information science than math/computer science (CS) theory and can also encompass graphs in which nodes and edges are given not only weights and values but different types. For example, a property graph of a service provider network collaboration may have vertex types for people, repos, documents and teams, and edges for committing to a repo, reviewing a CR, editing a document, commenting on a document, reading a document, belonging to a team, reporting to a manager, and so on. Models mentioned herein may be referred to as graphs even though values are assigned to each node.

Figure 2:
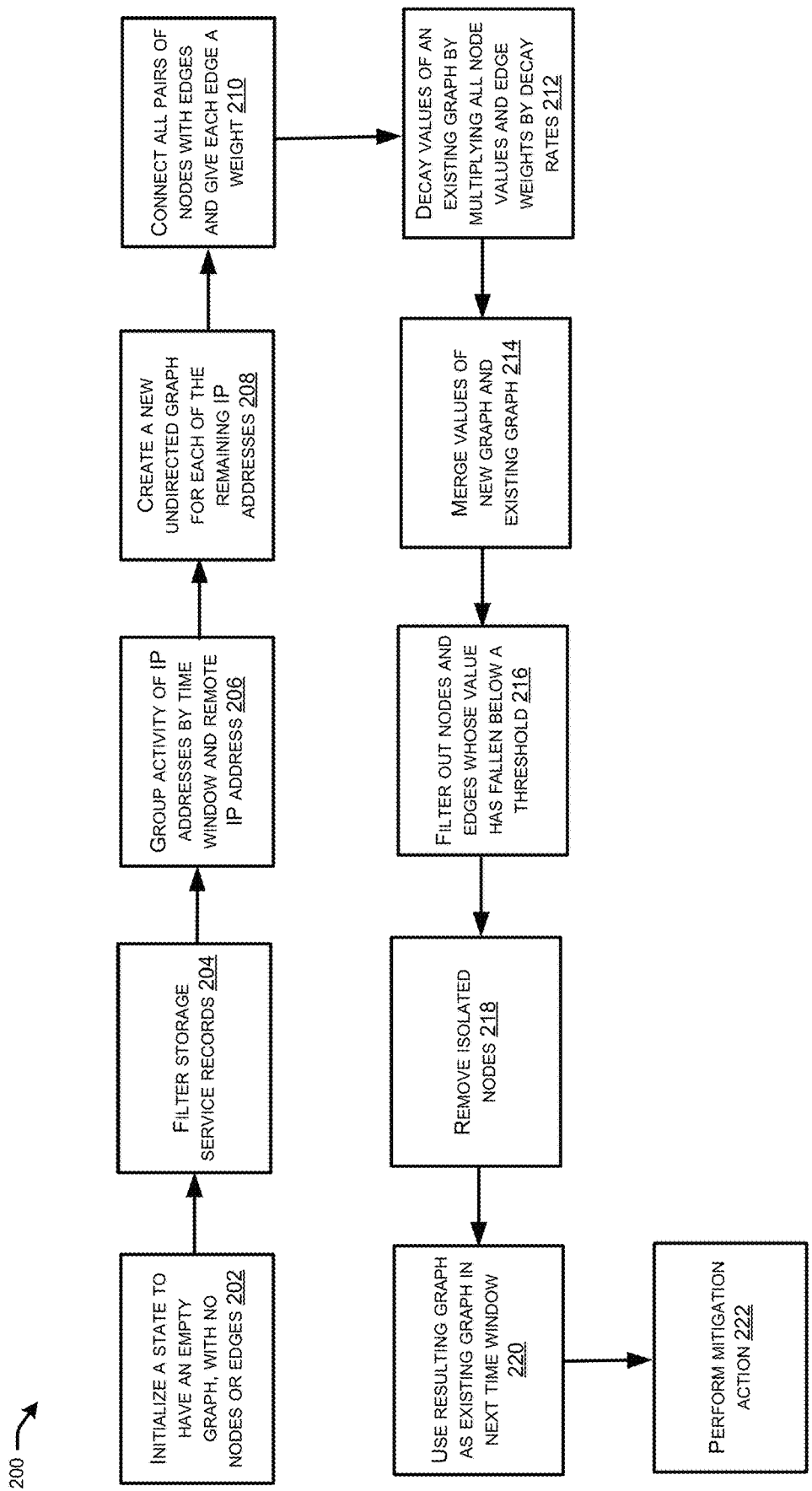
FIG. 2 schematically illustrates an example flow that the graphing service of the security service of FIG. 1 may perform for developing a graph for detecting IP addresses of birdshot scanners, e.g., bad actors.

FIG. 2 schematically illustrates an example flow 200 that the graphing service 110 of the security service 106 of FIG. 1 may perform for developing a graph for detecting IP addresses of birdshot scanners using information from the record system 122 of the storage services 104. In configurations, at 202 the state of a graph may be initialized by the graphing service 110 to have an empty graph, with no nodes or edges. $G_{prior}$=new_graph (V={ }, E={ }), where $G_{prior}$ represents a prior graph (however, at this point it is the first graph for the following process), V represents a set of vertices (nodes), and E represents a set of edges connecting vertices. In some configurations, at 204, incoming storage service records, e.g., event archive bus (EBA) records from the storage service 104 of FIG. 1, may be filtered by the graphing service 110, where the records may relate to attempts to access buckets within the storage service 104. Thus, only requests receiving a failure response, e.g., NoSuchBucket response, are used. In configurations, only unauthenticated access is considered. This may reduce data volume by approximately 5 times.

In each time window; steps 206 to 220 may be performed by the graphing service 110. At 206 activity of IP addresses may be grouped by time window and remote IP address by the graphing service 110. In configurations, records for all IP addresses that received failure responses 120 for fewer than a predetermined threshold, e.g., 50 distinct failure responses for 50 distinct storage buckets in the time window may be discarded by the graphing service 110. The predetermined threshold may be in a range of 30 to 70 distinct failure messages depending on the configuration.

At 208, a new undirected graph $G_{new}$ with a vertex for each of the remaining IP addresses may be created by the graphing service 110. Each node's value $v_i$ may be set to be the approximate number of distinct buckets for which the node received a failure response, e.g., NoSuchBucket response, in this time period.

At 210, all pairs of nodes in $G_{new}$ may be connected with edges by the graphing service 110 and each edge may be given a weight $w_{ij}$: similarity $(v_i,v_j)$ w_{ij}=\mathrm{similarity} (v\_i,v\_j) $w_{ij}$ =similarity $(v_i,v_j)$, where weight $w_{ij}$ represents a weight based on similarity between vertices i and j (based on their individual vortex values). The similarity is determined by using the function mathrm, as described further herein. In configurations, the similarity may be determined by the graphing service 110 by creating a system to build this graph but set the values of all edges in the graph to be 1 if the IP addresses were active concurrently and 0 otherwise. The similarity of two agents may be based on those agents' activity levels. If IP address A scans 500 buckets in a time period while IP address B scans 525, that should result in a much higher weight on the edge between them than if IP address B had scanned only 125 buckets in the same time period because IP address B was not as active IP address A during the same time period. Thus, the similarity between two nodes (vertices) may be described as mathrm=sim (i,j)=1.0−(($|v_i-v_j|$)/(max $(v_i, v_j)$))

P, where $v_i$, $v_j$ are an approximate number of unsuccessful requests from remote IP addresses attempting to access storage buckets of the storage service 104 of the service provider network 100 during the first time window, and where p is a power factor.

In configurations, at 212 the values of an existing graph $G_{prior}$ may be decayed by the graphing service 110 by multiplying all node values (v) and edge weights (w) by decay rates (d): w': $=\delta_{edges} \cdot w_{ij}$ and v': $=\delta_{nodes} \cdot v_i$ with $\delta_{edges}$, $\delta_{nodes}$ <1.0. By multiplying the values by something less than 1.0, if no new activity is observed for a given IP address (node), its value will slowly drop. In some configurations, the decay rate is in a range of 0.950 to 0.999. As an example, a decay value of 0.99 giving a half-life of 69 iterations, or 11.5 hours, may be used. In configurations, it may be desirable to decay things a little more slowly to capture longer-range patterns.

At 214, $G_{prior}$ and $G_{new}$ may then be merged together into a resulting graph by the graphing service 110. If an IP address is in $G_{new}$ but was not present in $G_{prior}$, then the IP address may be inserted into the resulting graph as a node (vertex). If the IP address was already present in $G_{prior}$, add the prior and new values together. The same may be done for pre-existing edges.

At 216, in configurations, nodes whose value has fallen below a predetermined threshold may be filtered out by the graphing service 110. This prevents the resulting graph from growing unbounded, e.g., growing to where the graph is too large to use since there are a limitless number of nodes, many of which may not be relevant and/or related, and thus not part of a bad actor's birdshot scan. This may also be done for edges whose value has fallen below a predetermined threshold.

Once edges are filtered out, at 218 any isolated edges may be removed by the graphing service 110, i.e., nodes with no edges connecting them to other nodes.

At 220, the resulting graph may be used as $G_{prior}$ by the graphing service 110 when repeating the example flow 200 in the next time window. In configurations, the time window may be in a range of 1 to 10 minutes, with some configurations using 5 minutes as the time window. In some configurations, the time window may be dynamic, e.g., one time window may be different in duration with respect to another time window.

Given the state of the graph at a certain point in time, the most active nodes and/or communities of interest may be determined. Once the most active nodes, e.g., IP addresses, and/or communities of interest are determined, at 222 a mitigation action may be performed by the graphing service 110. For example, if the summed activity of all members (nodes) of a birdshot scanning group is above a predetermined threshold, a mitigation for all of the corresponding IP addresses may be implemented, e.g., blocking the IP addresses or some other bad actor identifier such as, for example, an account number, for a period of time. This is a decision about multiple identifiers based on their collective behavior. As another example, a length of mitigation may be increased to all members of the group. This may be a lower risk way of implementing the first option (if the summed activity of all members (nodes) of a birdshot scanning group is above a predetermined threshold, a mitigation for all of the corresponding IP addresses may be implemented, e.g., blocking the IP addresses for a period of time), because the longer mitigations would only go into effect when the IP addresses next behave maliciously, and only on those IP addresses that do participate. Thus, if a benign IP address is mistakenly inferred to be a member of a malicious group, the benign IP address may not be blocked since it would not trigger any existing analytics. As a further example, the threshold used by an original storage service analytic may be lowered so that the offending IP address may be cut off sooner when the offending IP address next launches an attempt to access services. This may not significantly reduce the time until detection the next time around but might be able to limit the damage done by cutting off successive attempts sooner. As an additional example, mitigation may not be issued directly based on the graph processes output, but the output may be provided to other components such as an adjudicator/confidence scoring or "rules engine" so that other analytics may adjust their behavior based on the IP addresses participation in an offending group of IP addresses. In configurations, the mitigation action does not need to be applied every time window.

As an example, referring back to FIG. 1, bad actor 108*a* uses client device 116*a* to attack storage services 104 using IP addresses 1.1.1.1 and 2.2.2.2, and 4.4.4.4. The bad actor uses these IP addresses at t=1, t=2, and/or t=3. At t=1, IP addresses 1.1.1.1 and 2.2.2.2 are used, while at t=2, IP addresses 1.1.1.1 and 4.4.4.4 are used, and at t=3, IP addresses 2.2.2.2 and 4.4.4.4 are used. The bad actor 108*a* uses requests 118 and receives failure responses 120. At t=1, the bad actor 108*a* issues 100 requests 118 from IP address 1.1.1.1 and 150 requests 118 from IP address 2.2.2.2 and receives a corresponding number of failure responses 120. At t=2, the bad actor 108*a* issues 100 requests 118 from IP address 1.1.1.1 and 200 requests 118 from IP address 4.4.4.4 and receives a corresponding number of failure responses 120. At t=3, the bad actor 108*a* issues 100 requests 118 from IP address 2.2.2.2 and 100 requests 118 from IP address 4.4.4.4 and receives a corresponding number of failure responses 120.

Figure 3A:
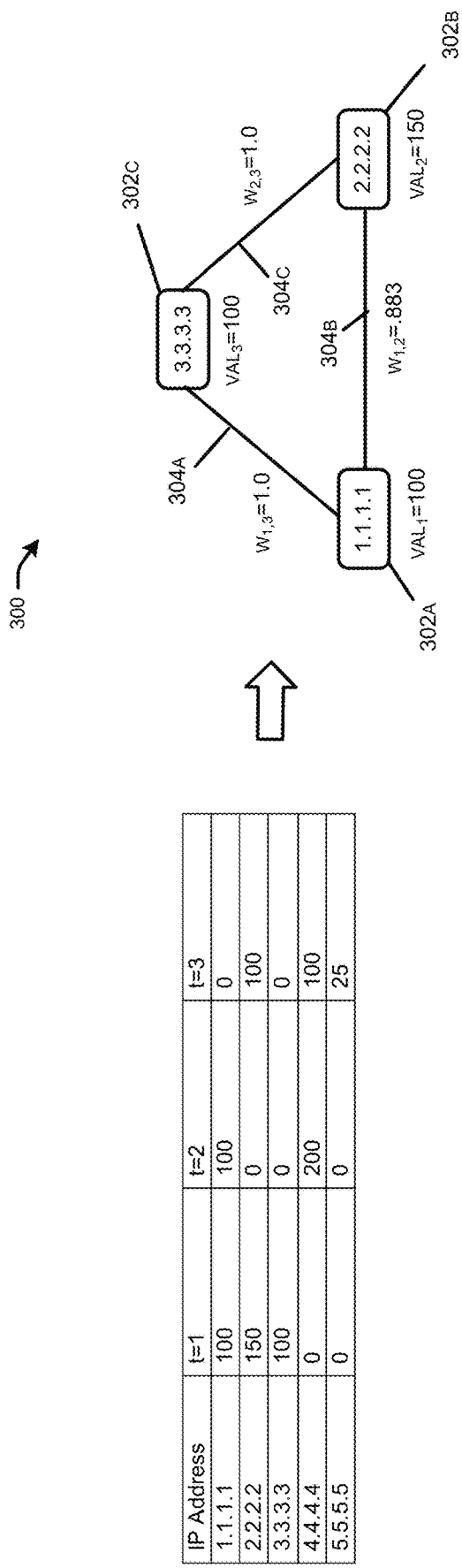
FIGS. 3A-3C schematically illustrate examples of the state of a graph over three time windows (steps).
Figure 3B:
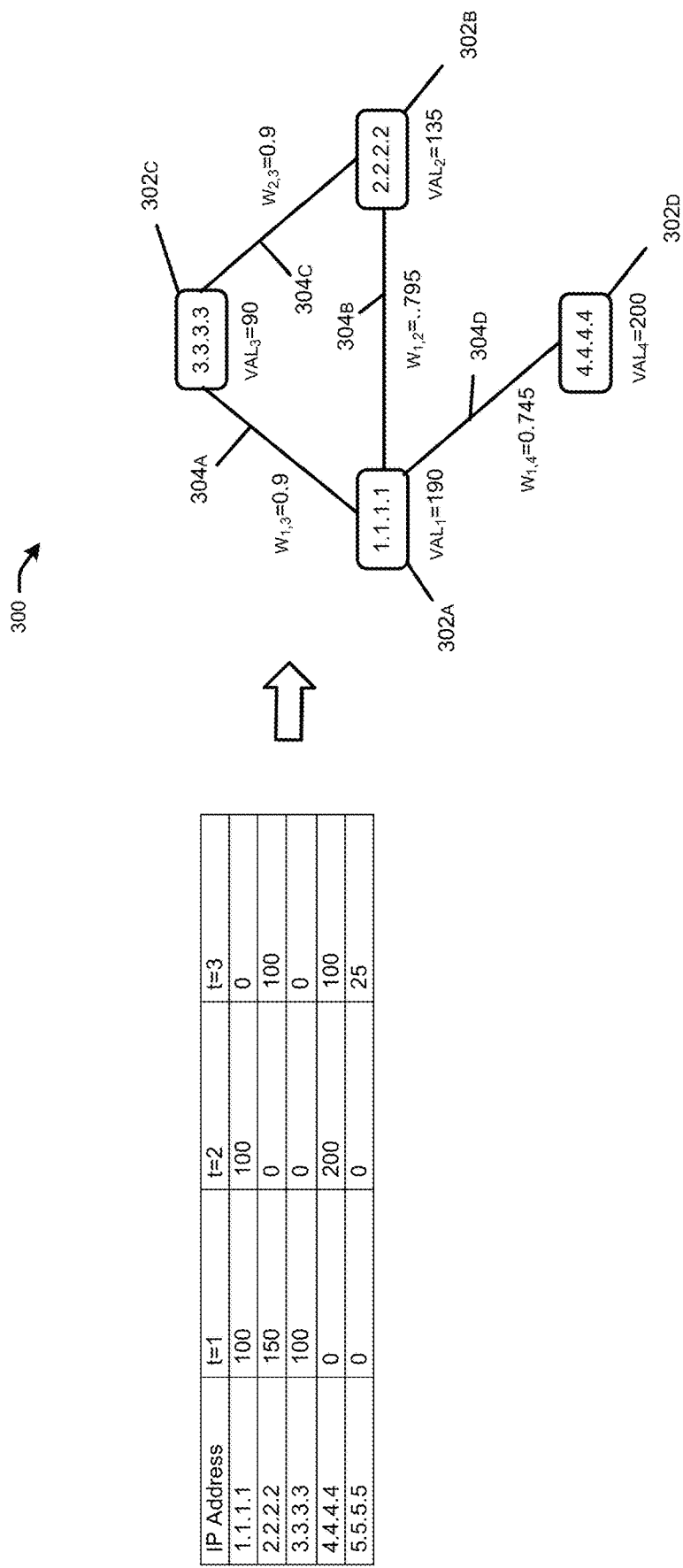
Figure 3C:
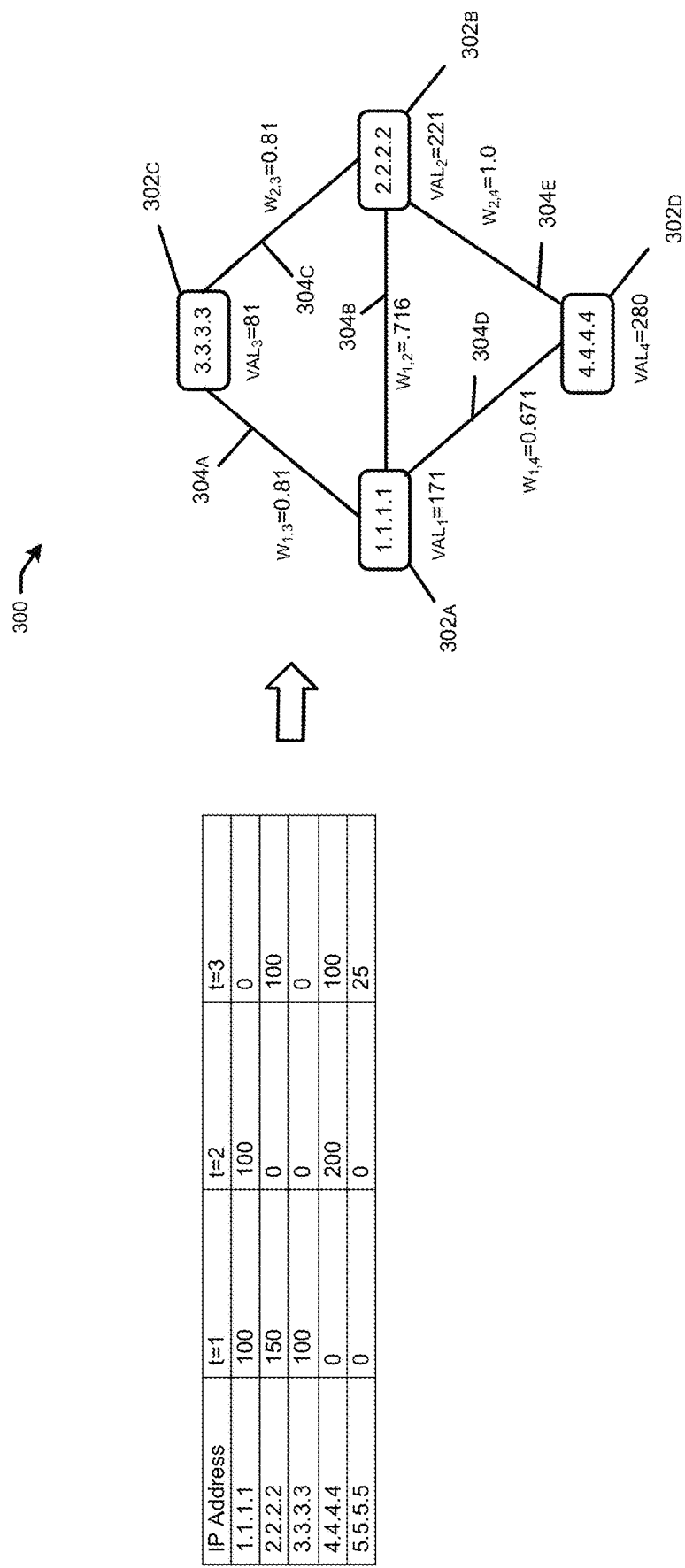

Using the above example, FIGS. 3A-3C schematically illustrate examples of the state of a graph 300 over three time windows (steps). In FIG. 3A, at t=1, three new nodes 302*a*-302*c* are created. Because node 302*a* (IP address 1.1.1.1) and node 302*c* (IP address 3.3.3.3) had the same bucket count of failure responses 120, the weight on their shared edge 304*a* is 1.0. The weight on the edges 304*b* and 304*c* between them and node 302*b* (IP address 2.2.2.2) is somewhat lower since their bucket counts (both 100) are less similar to node 302*b*'s bucket count (150).

In FIG. 3B, at t=2, all of the existing values in the graph 300 have been decayed. (In this example, by an aggressive 0.90 to make changes more obvious.) A new node 302*d* has been added for IP address 4.4.4.4. Since node 302*a* (IP address 1.1.1.1) is the only other active IP address, it is the only node with which node 302*d* shares an edge 304*d*. The value of node 302*a* has increased to reflect its continuing activity in this time window of t=2 (100+100=200).

In FIG. 3C, at t=3 a new edge 304*e* is added between node 302*b* (IP address 2.2.2.2) and node 302*d* (IP address 4.4.4.4) since they are both active. All the other nodes and edge values decay. No node or edges are created for IP address 5.5.5.5 since it did not have enough distinct buckets to qualify it for inclusion in the graph 300.

Thus, it may be determined that IP addresses 1.1.1.1, 2.2.2.2, and 4.4.4.4 are being used by a bad actor, e.g., bad actor 108*a*, due to the increasing node values of nodes 302*a*, 302*b*, and 302*d*. The edge weights of edges 304*b*, 304*e*, and 304*d* indicate a strong relationship between nodes 302*a*, 302*b*, and 302*d* and thus, indicate it is likely a single bad actor, e.g., bad actor 108*a* is using IP addresses 1.1.1.1, 2.2.2.2, and 4.4.4.4 for the attacks on the storage services 104.

In configurations, two IP addresses do not need to make requests at exactly the same millisecond in order to be active "simultaneously" for purposes of the techniques and architecture described herein. Events may be aggregated together into some length of time and all events at the same time may be considered to be concurrent.

Figure 4:
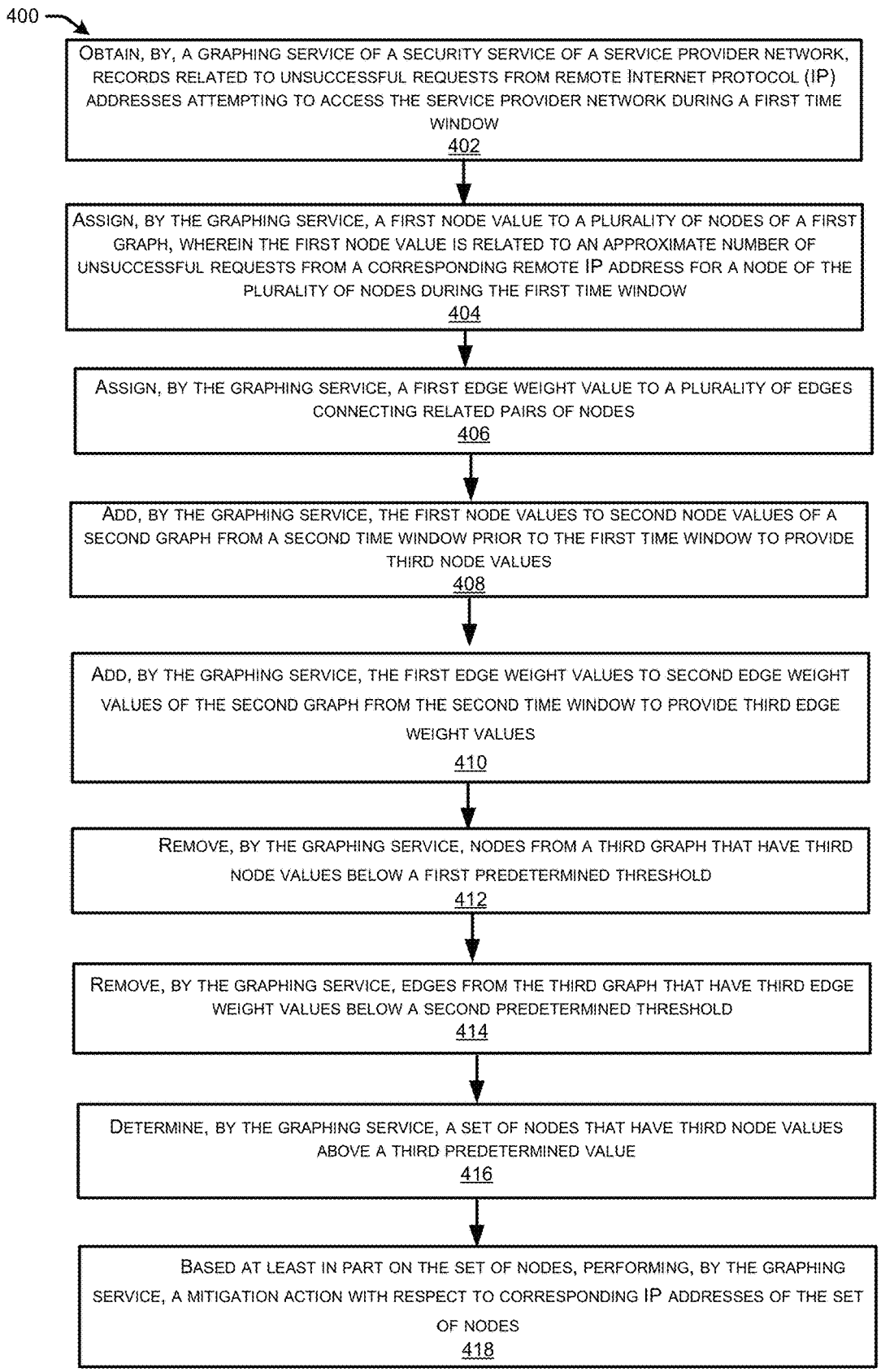
FIG. 4 is a flow diagram of an example method for identifying similar groups of IP addresses using a very sparse information feed for malicious behavior, e.g., bad actors in the form of birdshot scanners.

FIG. 4 illustrates an example flow diagram of example method 400 that illustrates aspects of the functions performed at least partly by the services as described in FIGS. 1-3C. The logical operations described herein with respect to FIG. 4 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 4 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 4 illustrates a flow diagram of the example method 400 for identifying similar groups of IPs using a very sparse information feed for malicious behavior. Groups of similar IP addresses may be discovered using an input stream consisting of, for example, "did the IP address receive greater than 50 failure responses in the last X minutes, and if so, how many?" in response to service inquiries at a service provider network. Using only this information about millions of IP addresses allows a graph of IP address interactions to be built with less data (up to four orders of magnitude) than the raw input. The state of the graph only needs to be maintained from one time window to the next. The state of the graph does not need to reference any state further back in history. Despite the limited amount of data used, the state of the graph may successfully predict which IP addresses will act in similar ways with respect to services of the service provider network scanning up to several days in the future.

At 402, a graphing service of a security service of a service provider network obtains records related to unsuccessful requests from remote Internet protocol (IP) addresses attempting to access the service provider network during a first time window. For example, in some configurations, at 204, incoming storage service records, e.g., event archive bus (EBA) records from the storage service 104 of FIG. 1, may be filtered by the graphing service 110, where the records may relate to attempts to access buckets within the storage service 104. Thus, only requests receiving a failure response, e.g., NoSuchBucket response, are used. In configurations, only unauthenticated access is considered. This may reduce data volume by approximately 5 times.

At 404, the graphing service assigns a first node value to a plurality of nodes of a first graph, wherein the first node value is related to an approximate number of unsuccessful requests from a corresponding remote IP address for a node of the plurality of nodes during the first time window. For example, a new undirected graph $G_{new}$ with a vertex for each of the remaining IP addresses may be created by the graphing service 110. Each node's value $v_i$ may be set to be the approximate number of distinct buckets for which the node received a failure response, e.g., NoSuchBucket response, in this time period. As used herein, "plurality" refers to two or more of an item, e.g., a plurality of nodes refers to two or more nodes.

At 406, the graphing service assigns a first edge weight value to a plurality of edges connecting related pairs of nodes. For example, all pairs of nodes in Grew may be connected with edges by the graphing service 110 and each edge may be given a weight $w_{ij}$: =similarity $(v_i,v_j)$ w_{ij}=\mathrm {similarity} (v\_i,v\_j) $w_{ij}$: =similarity $(v_i,v_j)$, where weight $w_{ij}$ represents a weight based on similarity between vertices i and j (based on their individual vortex values). The similarity is determined by using the function mathrm, as described further herein. In configurations, the similarity may be determined by the graphing service 110 by creating a system to build this graph but set the values of all edges in the graph to be 1 if the IP addresses were active concurrently and 0 otherwise. The similarity of two agents may be based on those agents' activity levels. If IP address A scans 500 buckets in a time period while IP address B scans 525 that should result in a much higher weight on the edge between them than if IP address B had scanned only 125 buckets in the same time period. Thus, the similarity between two nodes (vertices) may be described as mathrm=sim $(i,j)=1.0-((|v_i-v_j|)/(\max(v_i, v_j)))$ P, where $v_i$, $v_j$ are an approximate number of unsuccessful requests from remote IP addresses attempting to access storage buckets of the storage service 104 of the service provider network 100 during the first time window, and where p is a power factor.

At 408, the graphing service adds the first node values to second node values of a second graph from a second time window prior to the first time window to provide third node values. At 410, the graphing service adds the first edge weight values to second edge weight values of the second graph from the second time window to provide third edge weight values. For example, $G_{prior}$ and $G_{new}$ may then be merged together into a resulting graph by the graphing service 110. If an IP address is in $G_{new}$ but was not present in $G_{prior}$, then the IP address may be inserted into the resulting graph as a node (vertex). If the IP address was already present in $G_{prior}$, add the prior and new values together. The same may be done for pre-existing edges.

At 412, the graphing service removes nodes from a third graph that have third node values below a first predetermined threshold. At 414, the graphing service removes edges from the third graph that have third edge weight values below a second predetermined threshold. For example, in configurations, nodes whose value has fallen below a predetermined threshold may be filtered out by the graphing service 110. This prevents the resulting graph from growing unbounded. This may also be done for edges whose value has fallen below a predetermined threshold.

At 416, the graphing service determines a set of nodes that have third node values above a third predetermined value. At 418, based at least in part on the set of nodes, the graphing service performs a mitigation action with respect to corresponding IP addresses of the set of nodes. For example, Given the state of the graph at a certain point in time, the most active nodes and/or communities of interest may be determined. Once the most active nodes, e.g., IP addresses, and/or communities of interest are determined, at 222 a mitigation action may be performed by the graphing service 110. For example, if the summed activity of all members (nodes) of a birdshot scanning group is above a predetermined threshold, a mitigation for all of the corresponding IP addresses. This is a decision about multiple identifiers based on their collective behavior. As another example, a length of mitigation may be increased to all members of the group. This may be a lower risk way of implementing the first option, because the longer mitigations would only go into effect when the IP addresses next behave maliciously, and only on those IP addresses that do participate. Thus, if a benign IP address is mistakenly inferred to be a member of a malicious group, the benign IP address may not be blocked since it would not trigger any existing analytics. As a further example, the threshold used by an original storage service analytic may be lowered so that the offending IP address may be cut off sooner when the offending IP address next launches an attempt to access services. This may not significantly reduce the time until detection the next time around but might be able to limit the damage done by cutting off successive attempts sooner. As an additional example, mitigation may not be issued directly based on the graph processes output, but the output may be provided to other components such as an adjudicator/confidence scoring or "rules engine" so that other analytics may adjust their behavior based on the IP addresses participation in an offending group of IP addresses. In configurations, the mitigation action does not need to be applied every time window.

Accordingly, the techniques and architecture described herein provide for building a graph that is based on which IP address sources are active in the same time periods. By creating a node for each IP address with some moderate level of suspicious activity and connecting the nodes for any IP addresses that are engaging in that activity at roughly the same time (for example, within a 5-minute window), the graph usefully represents scenarios of possible cooperation between any sets of IP addresses in a way that allows one to uncover behavioral similarities between arbitrary subsets of IPs. Nodes in this graph and the links between are assigned values based on how much suspicious activity they engage in during each 5-minute window. These values decay over time if no new suspicious activity occurs. By analyzing the resulting graph at any particular point in time, how similar two IP addresses have been behaving recently can be measured without having to keep track of their total history of activity over the last several days. Thus, bad actors using the birdshot scanning attack can be detected quickly and more easily using less data than prior approaches, and computing resources of the service provider network are not used as long, freeing up computing and storage resources for processing of other data and/or other projects and/or services within the service provider network. Bad actors can also be detected more quickly and blocked, thereby saving stolen resources, confidential information, etc.

Figure 5:
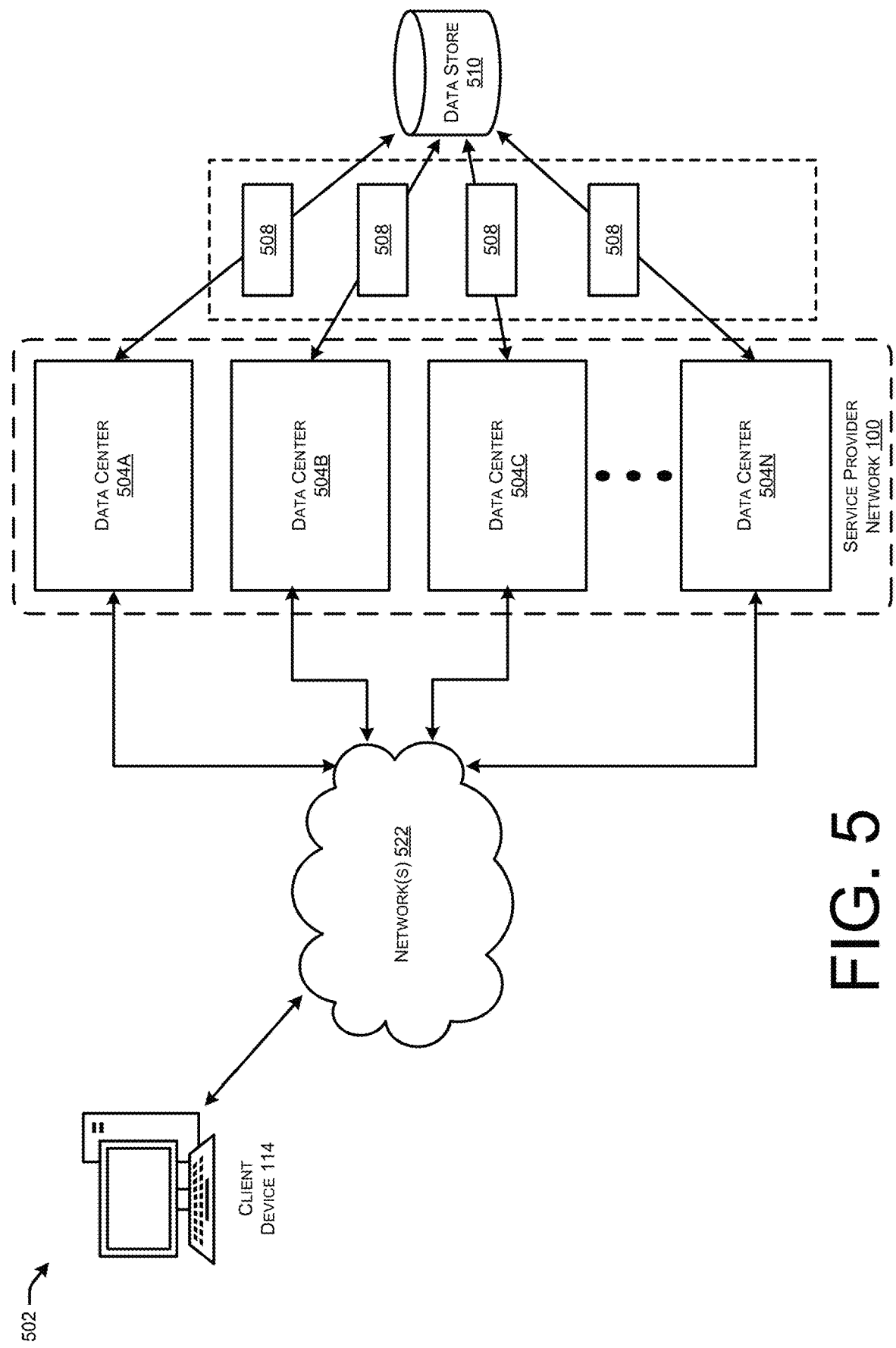
FIG. 5 is a system and network diagram that shows an illustrative operating environment that includes a service provider network that can be configured to implement aspects of the functionality described herein.

FIG. 5 is a system and network diagram that shows one illustrative operating environment 500 for the configurations disclosed herein that includes a service provider network 100 that can be configured to perform the techniques disclosed herein and which may be accessed by a computing device 502. The service provider network 100 can provide computing resources, like VM instances and storage, on a permanent or an as-needed basis. Among other types of functionality, the computing resources provided by the service provider network 100 may be utilized to implement the various services described above such as, for example, the graphing service 110.

Each type of computing resource provided by the service provider network 100 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 100 can also be configured to provide other types of computing resources not mentioned specifically herein.

The computing resources provided by the service provider network 100 may be enabled in one embodiment by one or more data centers 504A-504N (which might be referred to herein singularly as "a data center 504" or in the plural as "the data centers 504"). The data centers 504 are facilities utilized to house and operate computer systems and associated components. The data centers 504 typically include redundant and backup power, communications, cooling, and security systems. The data centers 504 can also be located in geographically disparate locations. One illustrative embodiment for a data center 504 that can be utilized to implement the technologies disclosed herein will be described below with regard to FIG. 5.

The data centers 504 may be configured in different arrangements depending on the service provider network 100. For example, one or more data centers 504 may be included in or otherwise make-up an availability zone. Further, one or more availability zones may make-up or be included in a region. Thus, the service provider network 100 may comprise one or more availability zones, one or more regions, and so forth. The regions may be based on geographic areas, such as being located within a predetermined geographic perimeter.

Users of the service provider network 100 may access the computing resources provided by the service provider network 100 over any wired and/or wireless network(s) 522, which can be a wide area communication network ("WAN"), such as the Internet, an intranet or an Internet service provider ("ISP") network or a combination of such networks. For example, and without limitation, a computing device, e.g., computing device 502, operated by a user of the service provider network 100 may be utilized to access the service provider network 100 by way of the network(s) 522. It should be appreciated that a local-area network ("LAN"), the Internet, or any other networking topology known in the art that connects the data centers 504 to remote customers and other users can be utilized. It should also be appreciated that combinations of such networks can also be utilized.

Each of the data centers 504 may include computing devices that include software, such as applications that receive and transmit data 508. For instance, the computing devices included in the data centers 504 may include software components which transmit, retrieve, receive, or otherwise provide or obtain the data 508 from a data store 510. For example, the data centers 504 may include or store the data store 510, which may include the data 508.

Figure 6:
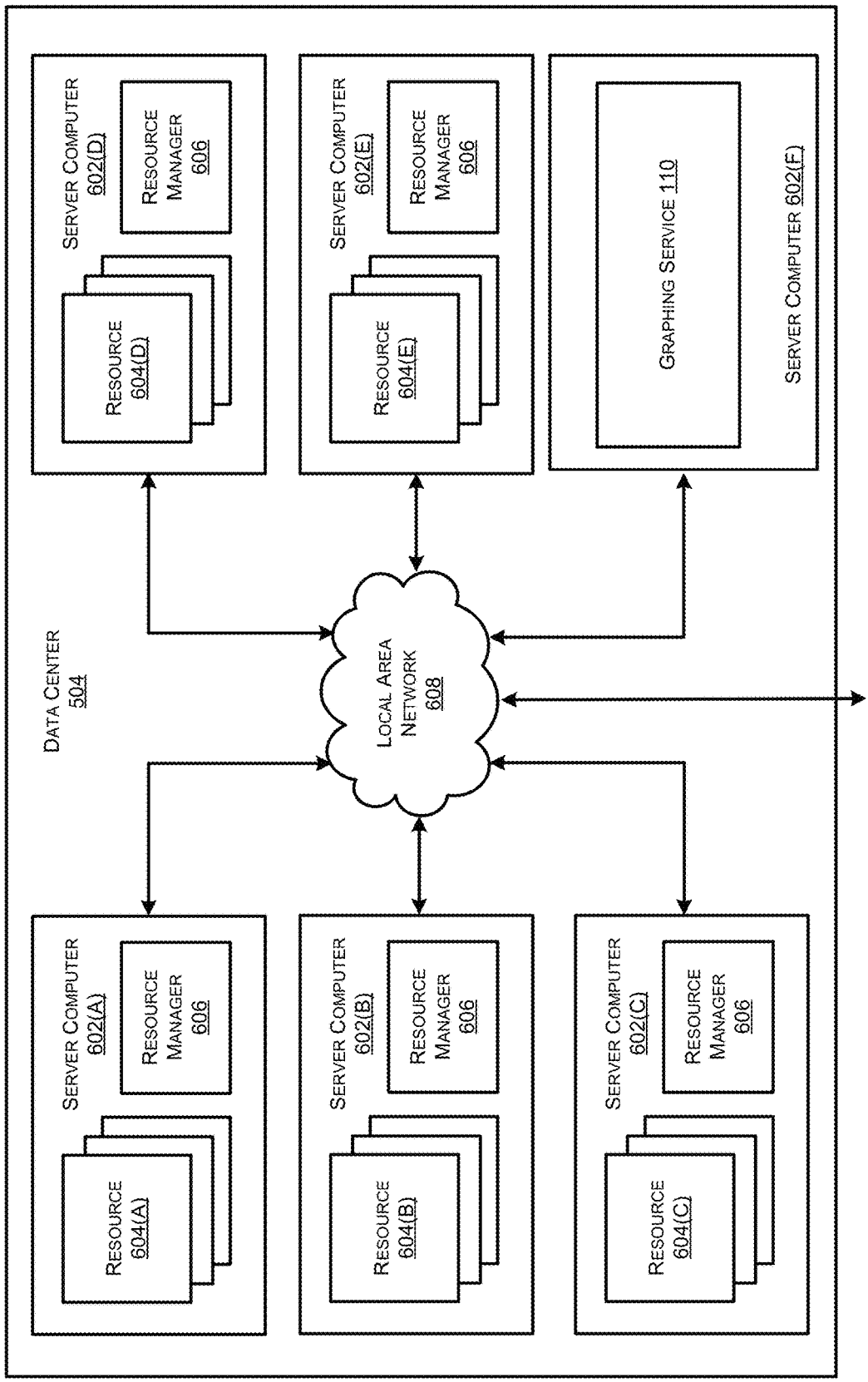
FIG. 6 is a computing system diagram illustrating a configuration for a data center that can be utilized to implement aspects of the technologies disclosed herein.

FIG. 6 is a computing system diagram that illustrates one configuration for a data center 504 that implements aspects of the technologies disclosed herein. The example data center 504 shown in FIG. 6 includes several server computers 602A-602F (which might be referred to herein singularly as "a server computer 602" or in the plural as "the server computers 602") for providing computing resources 604A-604E.

The server computers 602 can be standard tower, rack-mount, or blade server computers configured appropriately for providing the computing resources described herein (illustrated in FIG. 6 as the computing resources 604A-604E). As mentioned above, the computing resources provided by the service provider network 100 can be data processing resources such as VM instances or hardware computing systems, database clusters, computing clusters, storage clusters, data storage resources, database resources, networking resources, and others. Some of the server computers 602 can also be configured to execute a resource manager 606 capable of instantiating and/or managing the computing resources. In the case of VM instances, for example, the resource manager 606 can be a hypervisor or another type of program configured to enable the execution of multiple VM instances on a single server computer 602. Server computers 602 in the data center 504 can also be configured to provide network services and other types of services, some of which are described in detail below with regard to FIG. 8.

The data center 504 shown in FIG. 6 also includes a server computer 602F that can execute some or all of the software components described above. For example, and without limitation, the server computer 602F can be configured to execute components of the service provider network 100, including the graphing service 110, and/or the other software components described above. The server computer 602F can also be configured to execute other components and/or to store data for providing some or all of the functionality described herein. In this regard, it should be appreciated that the services illustrated in FIG. 6 as executing on the server computer 602F can execute on many other physical or virtual servers in the data centers 504 in various embodiments.

In the example data center 504 shown in FIG. 6, an appropriate LAN 608 is also utilized to interconnect the server computers 602A-602F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 504A-504N, between each of the server computers 602A-602F in each data center 504, and, potentially, between computing resources in each of the server computers 602. It should be appreciated that the configuration of the data center 504 described with reference to FIG. 6 is merely illustrative and that other implementations can be utilized.

Figure 7:
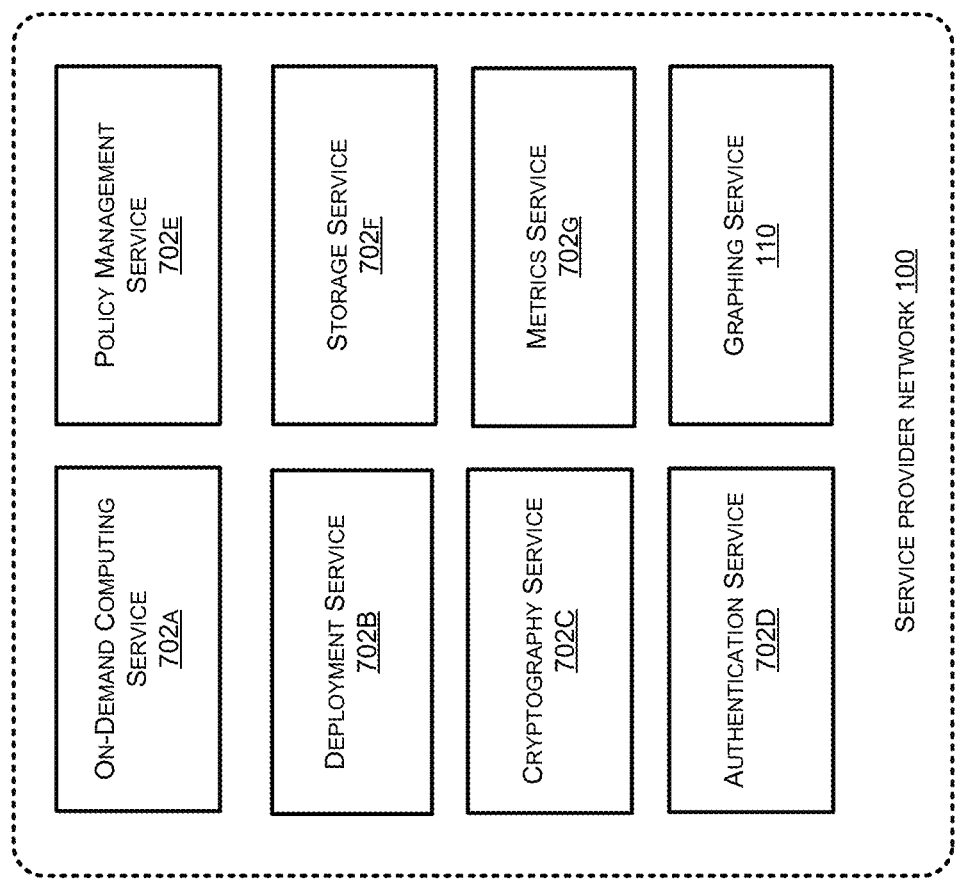
FIG. 7 is a network services diagram that shows aspects of several services that can be provided by and utilized within a system, or a larger system of which the system is a part, which is configured to implement the various technologies disclosed herein.

FIG. 7 is a system and network diagram that shows aspects of several network services that can be provided by and utilized within a service provider network 100 in one embodiment disclosed herein. In particular, and as discussed above, the service provider network 100 can provide a variety of network services to users within the service provider network 100, as well as customers, including, but not limited to, the graphing service 110. The service provider network 100 can also provide other types of services including, but not limited to, an on-demand computing service 702A (e.g., computing services 102), a deployment service 702B, a cryptography service 702C, a storage service 702D (e.g., storage services 104), an authentication service 702E, and/or a policy management service 702G, some of which are described in greater detail below. Additionally, the service provider network 100 can also provide other services, some of which are also described in greater detail below:

It should be appreciated that customers of the service provider network 100 can include organizations or individuals that utilize some or all of the services provided by the service provider network 100. As described herein, a customer or other user can communicate with the service provider network 100 through a network, such as the network 522 shown in FIG. 5. Communications from a user computing device, such as the client devices 114 and 116a-116n shown in FIG. 1, to the service provider network 100 can cause the services provided by the service provider network 100 to operate in accordance with the described configurations or variations thereof.

It is noted that not all embodiments described include the services described with reference to FIG. 7 and that additional services can be provided in addition to or as an alternative to services explicitly described. Each of the services shown in FIG. 7 can also expose network services interfaces that enable a caller to submit appropriately configured API calls to the various services through web service requests. In addition, each of the services can include service interfaces that enable the services to access each other (e.g., to enable a virtual computer system provided by the on-demand computing service 702A to store data in or retrieve data from a storage service). Additional details regarding some of the services shown in FIG. 7 will now be provided.

As discussed above, the on-demand computing service 702A (can be a collection of computing resources configured to instantiate VM instances and to provide other types of computing resources on demand. For example, a customer or other user of the service provider network 100 can interact with the on-demand computing service 702A (via appropriately configured and authenticated network services API calls) to provision and operate VM instances that are instantiated on physical computing devices hosted and operated by the service provider network 100.

The VM instances can be used for various purposes, such as to operate as servers supporting a web site, to operate business applications or, generally, to serve as computing resources for the customer. Other applications for the VM instances can be to support database applications such as those described herein, electronic commerce applications, business applications and/or other applications. Although the on-demand computing service 702A is shown in FIG. 7, any other computer system or computer system service can be utilized in the service provider network 100, such as a computer system or computer system service that does not employ virtualization and instead provisions computing resources on dedicated or shared computers/servers and/or other physical devices.

The service provider network 100 can also include a cryptography service 702C. The cryptography service 702C can utilize storage service 702F of the service provider network 100 to store encryption keys in encrypted form, whereby the keys are usable to decrypt customer keys accessible only to particular devices of the cryptography service 702C. The cryptography service 702C can also provide other types of functionality not specifically mentioned herein.

As illustrated in FIG. 7, the service provider network 100, in various embodiments, also includes an authentication service 702D and a policy management service 702E. The authentication service 702D, in one example, is a computer system (i.e., collection of computing resources) configured to perform operations involved in authentication of users. For instance, one of the services 702 shown in FIG. 7 can provide information from a user to the authentication service 702D to receive information in return that indicates whether or not the requests submitted by the user are authentic.

The policy management service 702E, in one example, is a network service configured to manage policies on behalf of customers or internal users of the service provider network 100. The policy management service 702E can include an interface that enables customers to submit requests related to the management of policy. Such requests can, for instance, be requests to add, delete, change or otherwise modify policy for a customer, service, or system, or for other administrative actions, such as providing an inventory of existing policies and the like.

The service provider network 100 can additionally maintain other services 702 based, at least in part, on the needs of its customers. For instance, the service provider network 100 can maintain a deployment service 702B for deploying program code and/or a data warehouse service in some embodiments. Other services can include object-level archival data storage services, database services, and services that manage, monitor, interact with, or support other services. The service provider network 100 can also be configured with other services not specifically mentioned herein in other embodiments.

Figure 8:
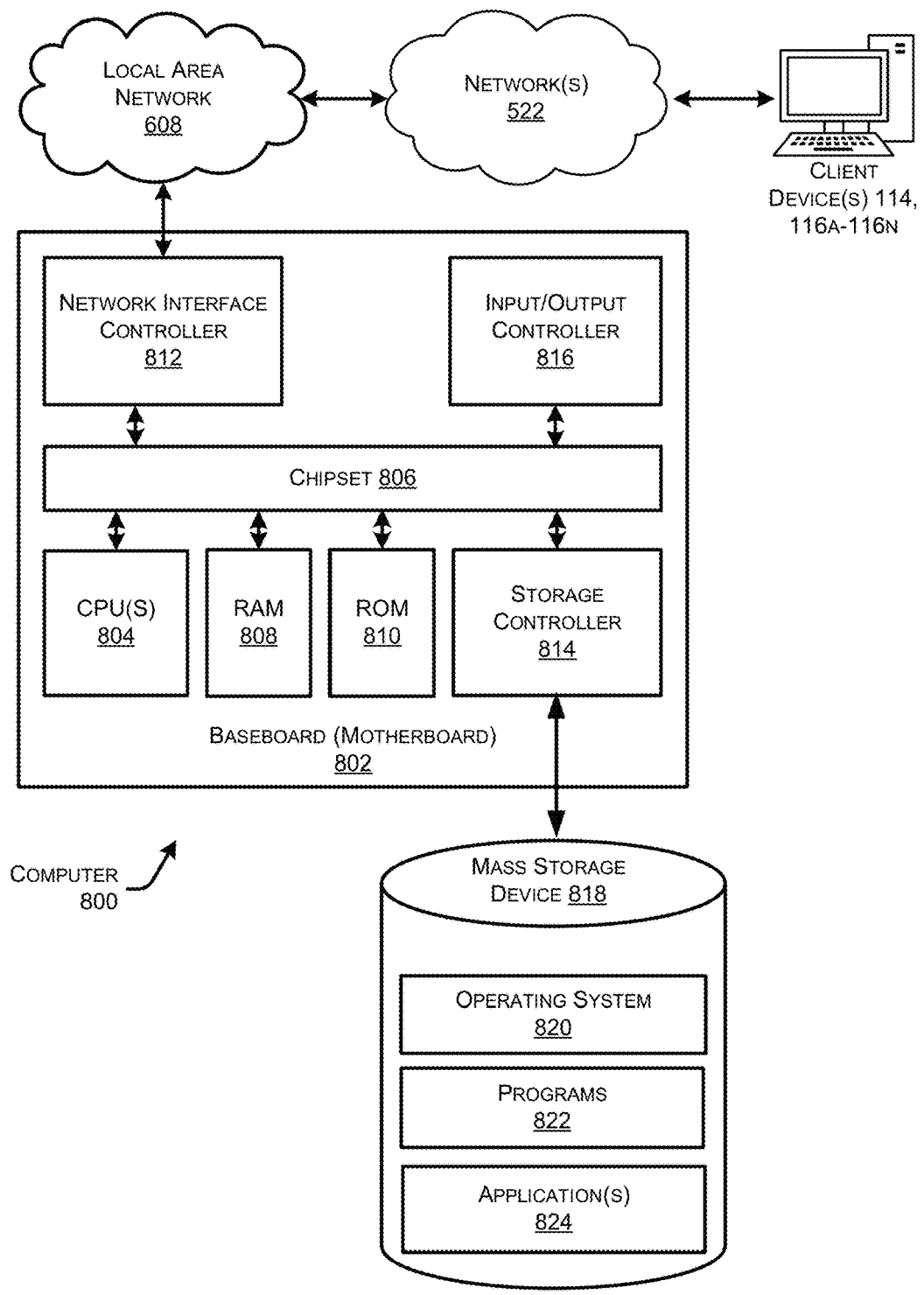
FIG. 8 is a computer architecture diagram showing an illustrative computer hardware architecture for implementing a computing device that can be utilized to implement aspects of the various technologies presented herein.

FIG. 8 shows an example computer architecture for a computer 800 capable of executing program components for implementing the functionality described above. The computer architecture shown in FIG. 8 illustrates a server computer, workstation, desktop computer, laptop, tablet, network appliance, e-reader, smartphone, or other computing device, and can be utilized to execute any of the software components presented herein.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices 502 and computer systems through a network, such as the network 826. The chipset 806 can include functionality for providing network connectivity through a Network Interface Controller (NIC) 812, such as a gigabit Ethernet adapter. The NIC 812 is capable of connecting the computer 800 to other computing devices 502 over the network 826 (or 522). It should be appreciated that multiple NICs 812 can be present in the computer 800, connecting the computer to other types of networks and remote computer systems.

The computer 800 can be connected to a mass storage device 818 that provides non-volatile storage for the computer. The mass storage device 818 can store an operating system 820, programs 822 (e.g., agents, etc.), data, and/or applications(s) 824, which have been described in greater detail herein. The mass storage device 818 can be connected to the computer 800 through a storage controller 814 connected to the chipset 806. The mass storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the mass storage device 818 by transforming the physical state of the physical storage units to reflect the information being stored. The specific transformation of physical states can depend on various factors, in different embodiments of this description. Examples of such factors can include, but are not limited to, the technology used to implement the physical storage units, whether the mass storage device 818 is characterized as primary or secondary storage, and the like.

For example, the computer 800 can store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the mass storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800. In some examples, the operations performed by the service provider network 100, and or any components included therein, may be supported by one or more devices similar to computer 800. Stated otherwise, some or all of the operations performed by the service provider network 100, and or any components included therein, may be performed by one or more computers 800 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 818 can store an operating system 820 utilized to control the operation of the computer 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The mass storage device 818 can store other system or application programs and data utilized by the computer 800.

In one embodiment, the mass storage device 818 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes described above with regard to FIGS. 1-8. The computer 800 can also include computer-readable storage media having instructions stored thereupon for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

The computer 800 may transmit, receive, retrieve, or otherwise provide and/or obtain data and/or results to and/or from the service provider network 100. The computer 800 may store the data on the operating system 820, and/or the programs 822 that are stored in the mass storage device 818 to update or otherwise modify the operating system 820 and/or the programs 822.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method comprising:
obtaining, by a graphing service of a security service of a service provider network, event archive bus (EBA) records related to unsuccessful requests from remote Internet protocol (IP) addresses attempting to access storage buckets of a storage service of the service provider network during a first time window;
grouping, by the graphing service, activity of the remote IP addresses by the first time window and remote IP address;
creating, by the graphing service, a first graph with a node for each remote IP address;
assigning, by the graphing service, a first node value to each node of the first graph, wherein each first node value is related to an approximate number of unsuccessful requests from a corresponding remote IP address during the first time window;
connecting, by the graphing service, related pairs of nodes in the first graph with edges;
assigning, by the graphing service, each edge connecting a pair of nodes a first edge weight;
multiplying, by the graphing service, all second node values and second edge weights of a second graph by a decay rate, wherein the second graph is based on a second time window prior in time to the first time window;
merging, by the graphing service, the first graph and the second graph into a third graph to provide third node values and third edge weights;
removing, by the graphing service, first nodes from the third graph that have third node values below a first predetermined threshold;
removing, by the graphing service, edges from the third graph that have third edge weight values below a second predetermined threshold;
removing, by the graphing service, second nodes from the third graph that have no edges connecting the first nodes to other nodes in the third graph;
determining, by the graphing service, a set of nodes in the third graph that have third node values that are equal to or above a third predetermined value; and
based on the set of nodes, performing, by the graphing service, an action with respect to corresponding IP addresses of the set of nodes.

2. The method of claim 1, wherein assigning each edge connecting a pair of nodes a first edge weight is based on similarity between nodes of the related pairs of nodes.

3. The method of claim 1, further comprising:
inserting, by the graphing service, a node in the third graph representing an IP address present in the first graph and absent from the second graph.

4. The method of claim 1, further comprising:
using, by the graphing service, the third graph in a subsequent time window as the second graph.

5. The method of claim 1, further comprising:
discarding, by the graphing service, records for remote IP addresses having a number of unsuccessful requests attempting to access the storage buckets of the storage service of the service provider network during the first time window that is below a fourth predetermined threshold.

6. A method comprising:
obtaining, by a service of a security service of a service provider network, records related to unsuccessful requests from remote Internet protocol (IP) addresses attempting to access the service provider network during a first time window;
assigning, by the service, a first node value to a plurality of nodes of a first graph, wherein the first node value is related to an approximate number of unsuccessful requests from a corresponding remote IP address for a node of the plurality of nodes during the first time window;
assigning, by the service, a first edge weight value to a plurality of edges connecting related pairs of nodes;
adding, by the service, the first node values to second node values of a second graph from a second time window prior to the first time window to provide third node values;
adding, by the service, the first edge weight values to second edge weight values of the second graph from the second time window to provide third edge weight values;
removing, by the service, nodes from a third graph that have third node values below a first predetermined threshold;
removing, by the service, edges from the third graph that have third edge weight values below a second predetermined threshold;
determining, by the service, a set of nodes that have third node values above a third predetermined value; and
based at least in part on the set of nodes, performing, by the service, a mitigation action with respect to corresponding IP addresses of the set of nodes.

7. The method of claim 6, further comprising:
removing, by the graphing service, first nodes from the third graph that have no edges connecting the first nodes to other nodes.

8. The method of claim 6, further comprising:
multiplying, by the graphing service, all second node values and second edge weights of the second graph by a decay rate.

9. The method of claim 8, wherein the decay rate is in a range of 0.950 to 0.999.

10. The method of claim 6, wherein the action comprises:
blocking, by the service, the corresponding IP addresses of the set of nodes from accessing the service provider network.

11. The method of claim 10, wherein blocking the corresponding IP addresses of the set of nodes from accessing the service provider network comprises blocking the corresponding IP addresses of the set of nodes from accessing the service provider network when the set of nodes appears in a subsequent third graph that have node values above the third predetermined value during a subsequent time window.

12. The method of claim 6, wherein assigning the first edge weight value to the plurality of edges connecting related pairs of nodes is based on similarity between nodes of the related pairs of nodes.

13. The method of claim 6, further comprising:
inserting, by the service, a node in the third graph representing an IP address present in the first graph and absent from the second graph.

14. The method of claim 6, further comprising:
using, by the service, the third graph in a subsequent time window as the second graph.

15. The method of claim 6, further comprising:
discarding, by the service, records for remote IP addresses having a number of unsuccessful requests attempting to access services of the service provider network during the first time window that is below a fourth predetermined threshold.

16. One or more computer-readable media storing computer-executable instructions that, when executed, cause one or more processors to perform operations comprising:
obtaining, by a service of a security service of a service provider network, records related to unsuccessful requests from remote Internet protocol (IP) addresses attempting to access the service provider network during a first time window;
assigning, by the service, a first node value to a plurality of nodes of a first graph, wherein the first node value is related to an approximate number of unsuccessful requests from a corresponding remote IP address during the first time window;
assigning, by the service, a first edge weight value to a plurality of edges connecting related pairs of nodes;
adding, by the service, the first node values to second node values of a second graph from a second time window prior to the first time window to provide third node values;
adding, by the service, the first edge weight values to second edge weight values of the second graph from the second time window to provide third edge weight values;
removing, by the service, nodes from a third graph that have third node values below a first predetermined threshold;
removing, by the service, edges from the third graph that have third edge weight values below a second predetermined threshold;
determining, by the service, a set of nodes that have third node values above a third predetermined value; and
based at least in part on the set of nodes, performing, by the service, a mitigation action with respect to corresponding IP addresses of the set of nodes.

17. The one or more computer-readable media of claim 16, further comprising:
removing, by the service, first nodes from the third graph that have no edges connecting the first nodes to other nodes.

18. The one or more computer-readable media of claim 16, further comprising:
multiplying, by the service, all second node values and second edge weights of the second graph by a decay rate.

19. The one or more computer-readable media of claim 18, wherein the decay rate is in a range of 0.950 to 0.999.

20. The one or more computer-readable media of claim 16, wherein the mitigation action comprises:
   blocking, by the service, the corresponding IP addresses of the set of nodes from accessing the service provider network.

\* \* \* \* \*